United States Patent [19]
Atkinson

[11] Patent Number: 6,048,163
[45] Date of Patent: Apr. 11, 2000

[54] MECHANISM TO RETRIEVE AND STACK CONTAINER SEPARATION SHEETS BY STACKING, SQUARING AND POSITIONING SUCH SHEETS ON A FLOOR LEVEL PALLET

[75] Inventor: James K. Atkinson, Crystal Lake, Ill.

[73] Assignee: Canconex, Inc., Algonquin, Ill.

[21] Appl. No.: 09/010,311

[22] Filed: Jan. 21, 1998

[51] Int. Cl.[7] .................................................. B65G 57/04
[52] U.S. Cl. ........................... 414/788.9; 414/790.6; 414/793.1; 414/802; 198/689.1; 271/196; 271/197; 271/276
[58] Field of Search .............................. 414/788.9, 790.6, 414/790.7, 793, 793.1, 794.6, 794.8, 797, 802; 271/276, 196, 197, 3.11, 5, 7, 6, 11, 12; 198/689.1

[56] References Cited

U.S. PATENT DOCUMENTS

| | | | |
|---|---|---|---|
| 3,146,902 | 9/1964 | Voelker | 414/797 |
| 3,205,794 | 9/1965 | Califano et al. | 414/790.6 |
| 4,068,837 | 1/1978 | Lamos | 414/793.1 |
| 4,124,128 | 11/1978 | Adams et al. | 414/790.6 |
| 4,380,332 | 4/1983 | Davis | 414/793.1 |
| 4,500,243 | 2/1985 | Ward, Jr. et al. | 414/793.1 |
| 4,840,369 | 6/1989 | Takahashi | 271/276 |
| 5,461,467 | 10/1995 | Malachowski | 271/276 |
| 5,569,016 | 10/1996 | Mokler | 414/793.1 |

FOREIGN PATENT DOCUMENTS

| 969938 | 7/1958 | Germany | 414/793.1 |
|---|---|---|---|

*Primary Examiner*—Douglas Hess
*Attorney, Agent, or Firm*—Banner & Witcoff, Ltd.

[57] ABSTRACT

Apparatus for receiving, transporting and stacking thin sheets onto a transport pallet includes a vacuum conveyor for transporting the sheets one at a time from a horizontal collection station vertically downward and then horizontally onto a collection pallet.

5 Claims, 3 Drawing Sheets

MECHANISM TO RETRIEVE AND STACK CONTAINER SEPARATION SHEETS BY STACKING, SQUARING AND POSITIONING SUCH SHEETS ON A FLOOR LEVEL PALLET

BACKGROUND OF THE INVENTION

This invention relates to apparatus for receiving and transporting individual, thin sheets that separate layers of cans or containers from a can conveyor to a pallet.

In the bottle filling or can filling operation, layers of containers are arrayed in adjacent rows and separated by thin sheets of fiberboard or plastic. Multiple layers of such cans are separated by thin sheets, for example, sheets of chipboard or plastic sheets, and the entire assembly of containers and separation sheets is supported on a pallet. Typically, the support pallet has a dimension in the range of approximately 44–45 inches by 56–60 inches. A layer of cans or bottles is then stacked uniformly upon the pallet. A separation sheet, which will have a thickness of perhaps $1/16$ to $1/8$ of an inch, is then placed over the layer of cans and another layer of cans or containers is then provided on top of the sheet. In actual practice, more than 20 layers of cans or containers may be stacked or supported on a pallet with a separation sheet between each layer.

The pallets are assembled at a can or container manufacturing facility and are then transported to a fluid filling facility, for example in association with a brewery. At the fluid filling facility, the pallets are arranged so that each horizontal layer of containers is oriented in alignment with a horizontal conveyor belt. Single layers of cans are then transferred onto the conveyor belt from the pallet where they are moved onwardly into filling equipment. As each layer of containers is moved onto the conveyor belt, the separation sheet, which covers the next layer of containers, is typically removed by suction cups. The suction cups are attached to a frame or bracket which lifts the sheet and removes the sheet from the subsequent, lower layer of cans. The sheet is then transported by the suction cup mechanism laterally from the layer of cans. The suction is next released, thereby dropping the sheet into a bin or collection container. The pallet is then raised and thereby aligning the next layer of cans or containers with the horizontal conveyor. The next horizontal layer of cans is then transported or moved onto the horizontal conveyor, again exposing the next separation sheet. Layers of cans and separation sheets are thus continuously transported appropriately and respectively onto a conveyor belt or removed by suction cups from the layers of cans and deposited into a bin or container.

The sheets, upon removal from the layers of cans on the can transport pallet, are typically released from an elevated position as much as 15 to 20 feet above the bin into which they are to be deposited. Upon such release, the sheets will typically fall into the bin but will not fall in a proper orientation. Further the sheets may become bent, broken or otherwise damaged in such an operation. The cost associated with the loss of damaged sheets is significant. For example, a single chipboard sheet costs approximately 35¢. It is possible to utilize such chipboard sheets over and over provided they are not damaged. Plastic sheets may cost as much as $7.00 per sheet and assuming they are not damaged, they may be washed and reused.

With the suction cup transport and release system heretofore utilized, however, the chipboard or plastic sheets used to separate layers of cans or containers are often destroyed, damaged or otherwise become unusable. Thus there has developed the need to provide a means for removing separate layers of separation sheets from the container transport pallets and for collecting and assembling those sheets in a coherent, safe and reusable fashion. This need led to the development of the present invention.

SUMMARY OF THE INVENTION

Briefly, the present invention comprises an apparatus for receiving and transporting thin separation sheets from a source such as a container transport pallet. The apparatus includes an elevated horizontal conveyor which is at approximately the same level as a discharge station for a container pallet associated with discharge of cans onto a container conveyor. Suction cups remove the separation sheets over a layer of cans or containers. The sheet is then transported transversely and positioned on the horizontal conveyor at a sheet receiving station approximately at the same elevation as the pallet discharge station.

The apparatus further includes a conveyor belt at the horizontal receiving station which has a vacuum feature. The conveyor belt thus grips each of the separation sheets deposited thereon by means of the vacuum and transports the sheet from the horizontal receiving station downwardly along a vertical leg or run where the sheet engages a mechanical guide bar assembly that effects removal of the sheet from the vacuum conveyor and directs the sheet into a storage bin at the bottom of the vertical conveyor run. The storage or sheet collection bin defines a pallet stacking station for the sheets which are received and guided thereto by the mechanical bar assembly. The sheets are aligned with respect to one another by means of one or more wall guide members. The sheets are stacked one on top of the other with their sides aligned and positioned on a pallet support mechanism. The pallet support mechanism includes a vertical height adjustment mechanism, insures appropriate receipt of the sheets in a stacked relationship, one upon the other, and further insures that multiple stacked sheets may be received upon the support pallet.

Thus, it is an object of the invention to provide an improved apparatus for receiving, transporting and precisely stacking thin separation sheets that are removed from separate layers of containers or cans on a pallet.

Another object of the invention is to provide an improved apparatus for the collection and stacking of separation sheets of the type which are used to separate layers of cans or other containers on a pallet.

Yet a further object of the invention is to provide an improved apparatus which is useful for collecting and stacking sheets of chipboard or plastic by collecting and conveying said sheets from a vertical height to a floor mounted pallet and for arranging said sheets in a desired array in a stack whereby said sheets can be reused.

These and other objects, advantages and features of the invention will be set forth in the detailed description which follows.

BRIEF DESCRIPTION OF THE DRAWINGS

In the detailed description which follows, reference will be made to the drawing comprised of the following figures.

DESCRIPTION OF THE PREFERRED EMBODIMENT

Figure 1:
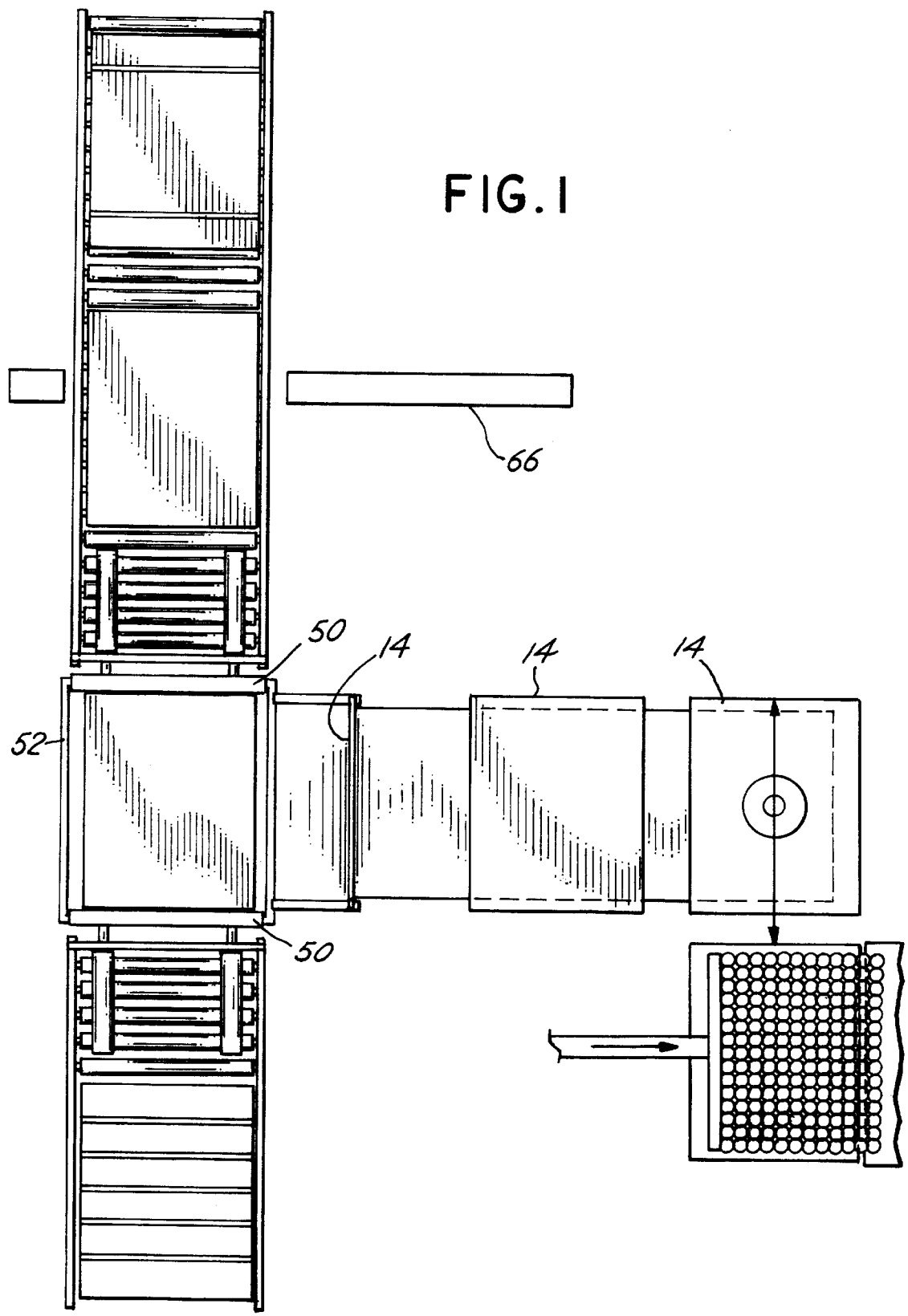
FIG. 1 is a top plan view of the apparatus of the invention.
Figure 2:
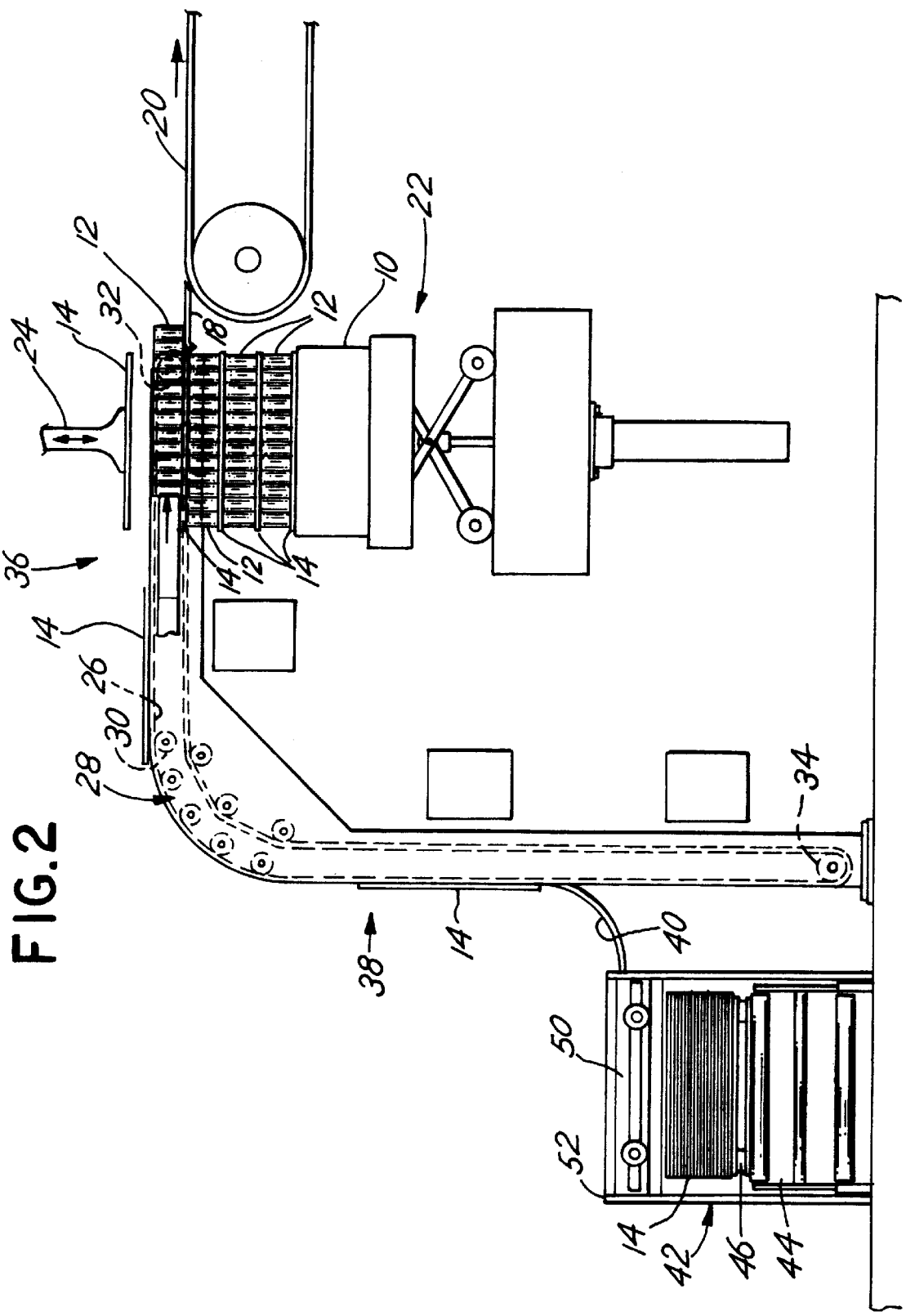
FIG. 2 is a side elevation of the apparatus of the invention.

Referring to the figures, the typical can filling or bottle filling operation utilizes a pallet construction or pallet 10 which has layers of cans (containers) 12 separated by separation sheets 14. The top layer of cans 12 in such an array is discharged or moved from a sheet 14 by means of some type of pushing assembly or arm over a platen or plate 18 and onto a horizontal conveyor 20. The layer of cans 12 thus move by means of a conveyor 20 into a container filling apparatus (not shown). For example, in a brewery, the cans 12 are moved onto the conveyor 20 and thence into a beer filling apparatus for the cans 12.

The pallet 10 is supported on an elevating mechanism 22 so that as each layer of cans 12 is appropriately positioned for movement from sheet 14 over the plate 18 and onto the conveyor 20. The sheet 14 is then removed and the pallet is raised so that the next layer of cans 12 may be appropriately aligned with the conveyor 20 for movement onto said conveyor 20.

Typically the sheets 14 are of a chipboard or plastic material. A typical size of a sheet is 44 inches by 56 inches. A typical thickness of a sheet 14 is from $\frac{1}{32}$ to $\frac{3}{8}$ inch. The particle board or chipboard sheets 14 are typically removed from the top layer of cans 12 by means of a vacuum mechanism 24. The vacuum mechanism 24 thus removes sheet 14 and exposes the top layer of the cans 12 so that that layer of cans 12 may be positioned onto the conveyor 20.

Heretofore, the vacuum mechanism 24 would merely remove the top sheet 14 and move it transverse to the pallet 10. Thereafter, the sheet 14 would be released by the vacuum mechanism and dropped into a collection bin. Upon dropping into a collection bin, the sheet 14 may become twisted, bent or otherwise damaged or destroyed.

The present invention relates to a mechanism or apparatus for appropriately collecting, transporting and stacking separation sheets 14. In particular, the system includes a closed loop conveyor belt 26 which is mounted on a bracket assembly 28. The conveyor belt 26 is guided over rolls 30 and 32 and 34. The conveyor 30 thus moves from an upper horizontal collection station 36 along a horizontal run which transcends or flows into a depending vertical run 38. The conveyor 30 has a vacuum associated therewith so that the sheets 14 are maintained on the conveyor 30 and do not fall or release from the conveyor 30 until the sheets 14 come into contact with a mechanical guide bar mechanism 40 at the lower end of the run 38. The mechanical guide bar mechanism 40 intersects the sheets 14 which are being carried by the conveyor 30 and guides those sheets 14 into a stacking assembly 42. In the stacking assembly 42, a lower pallet support 44 supports a pallet 46. The sheets 14 are guided over onto the pallet 46 by means of a mechanical guide bar 40. The stacker or stacking assembly 42 further includes side rails such as rails 50 and 52 which facilitate alignment of the sheets 14 as they are stacked one upon the other as they are guided into the stacker 42. In this manner, the sheets 14 are appropriately aligned with respect to each other on top of the pallet 46. The pallet support 44 may be lowered as needed in order to receive additional sheets 14. The stacker 42 may include walls 50 which are movable by means of cylinders 56 so as to appropriately engage and align the sheets 14 on the pallet support 44 as illustrated in FIG. 3.

Figure 3:
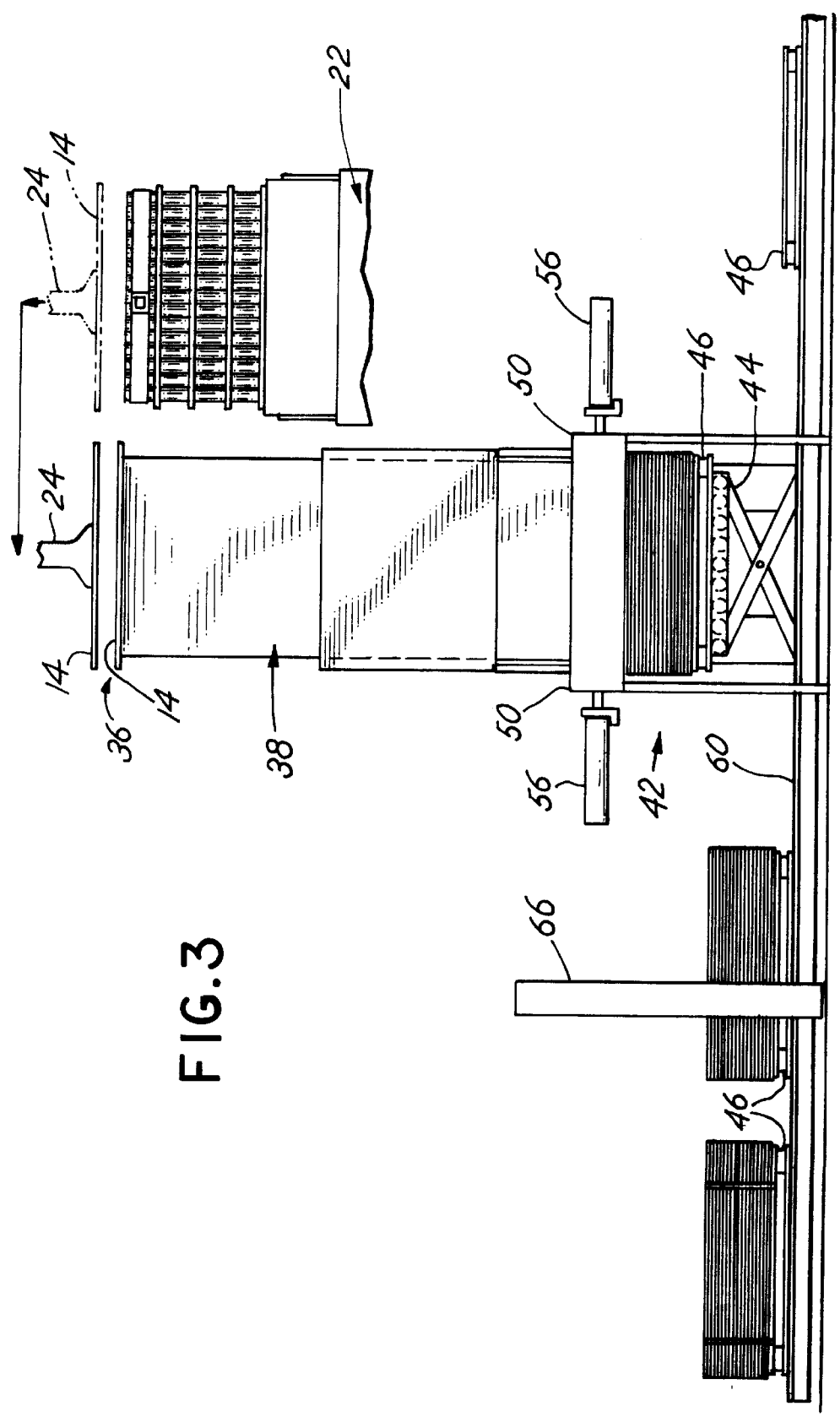
FIG. 3 is an end view of the apparatus of the invention.

Upon receipt of an appropriate number of sheets 14 supported on the pallet 46, the pallet support 44 will lower the pallet 46 onto a transport conveyor 60 which will transport the pallet 46 as shown in FIG. 3 and position another pallet 46 upon the pallet support 44. The pallet support 44 may then be raised to receive the next stack of sheets 14. Again the cylinders 56 and walls 50 will be operated intermittently to make sure that all of the sheets 14 are appropriately aligned. The movable walls 50 may be opposed or at right angles to effect alignment of sheets 14. As an optional and additional feature, a strapping mechanism 66 may be positioned over the conveyor 60 to strap or tie the sheets 14 onto the pallet 42.

It is to be noted that the vacuum transport conveyor 30 continuously provides a vacuum so that the sheets 14 may be transferred from a horizontal collecting or initial station downwardly vertically along the run 38 and toward the stacker 42. The vacuum is adjusted so that the sheets 14 may be easily removed from the conveyor during the vertically downwardly travel by means of the mechanical discharge bar assembly 40.

It is possible to vary the construction of the invention without departing from the true scope thereof for example the conveyor 30 may be constructed to transfer sheets 14 horizontally or upwardly. The invention, therefore, is to be limited only by the following claims and their equivalents.

What is claimed is:

1. Apparatus for receiving, transporting and precisely stacking thin, container separation sheets onto a transport pallet comprising, in combination:

a vacuum conveyor belt having a horizontal receiving station, said belt comprising a unitary belt member for transport of a sheet from said horizontal receiving station, said belt further comprising a vertically descending run to a sheet discharge station, said conveyor belt having vacuum suction means for retaining a sheet placed thereon in a predetermined orientation from the horizontal receiving station to the sheet discharge station;

a mechanical guide bar assembly at the sheet discharge station for engaging and removing a sheet at the sheet discharge station and for directing the sheet to a horizontal orientation stacking station adjacent to and spaced from the vertically descending run;

a sheet collection bin at the stacking station, said bin comprised of a horizontal pallet support plate forming a bottom of the bin and for support of a pallet for sheets discharged into the bin, vertical side wall members along the edges of the pallet support plate for guiding and retaining sheets discharged to the stacking station, at least one of the wall members including means for engaging the side of a plurality of stacked sheets and thereby aligning said sides, and a pallet plate support including a vertical height adjustment mechanism for movement of the plate and a pallet supported thereby to receive multiple stacked sheets.

2. The apparatus of claim 1 including first and second means for engaging the side of stacked sheets, said first and second means oriented for engaging distinct sides of the sheets.

3. The apparatus of claim 2 wherein the first and second means are oriented to engage sides of sheets at right angles with respect to one another.

4. The apparatus of claim 1 further including a pallet conveyor from the stacking station.

5. A method for receiving, transporting and stacking thin container separation sheets from a container pallet onto a transport pallet, comprising in combination the following steps:

lifting a sheet from a container pallet by a vacuum system;

depositing the sheet onto a horizontal receiving station adjacent the container pallet;

said station having a conveyor belt mechanism and a vacuum retention for holding the sheet on the belt;

moving the sheet by the movement of the belt to a mechanical belt discharge assembly;

discharging the sheet at the discharge assembly horizontally onto a transport pallet; and aligning the sheet on the transport pallet.

* * * * *